(12) United States Patent
Pham et al.

(10) Patent No.: US 12,004,054 B1
(45) Date of Patent: Jun. 4, 2024

(54) ELECTRONIC DEVICES WITH MOTION-BASED PROXIMITY SENSING

(71) Applicant: Apple Inc., Cupertino, CA (US)

(72) Inventors: Hung A. Pham, Sunnyvale, CA (US); Duy N. Phan, Los Gatos, CA (US); Sunny K. Chow, Santa Clara, CA (US); Vinay R. Majjigi, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 251 days.

(21) Appl. No.: 17/362,637

(22) Filed: Jun. 29, 2021

Related U.S. Application Data

(60) Provisional application No. 63/059,883, filed on Jul. 31, 2020.

(51) Int. Cl.
| | | |
|---|---|---|
| *H04W 4/23* | (2018.01) | |
| *H04B 17/318* | (2015.01) | |
| *H04W 4/02* | (2018.01) | |
| *H04W 4/48* | (2018.01) | |
| *H04W 4/80* | (2018.01) | |
| *H04W 24/10* | (2009.01) | |

(52) U.S. Cl.
CPC ............ *H04W 4/23* (2018.02); *H04B 17/318* (2015.01); *H04W 4/027* (2013.01); *H04W 4/48* (2018.02); *H04W 4/80* (2018.02); *H04W 24/10* (2013.01)

(58) Field of Classification Search
None
See application file for complete search history.

(56) References Cited

U.S. PATENT DOCUMENTS

| | | | |
|---|---|---|---|
| 9,557,420 B2 | 1/2017 | Katsman | |
| 10,855,664 B1 | 12/2020 | Ziraknejad et al. | |
| 2015/0245164 A1* | 8/2015 | Merrill | H04W 4/06 370/329 |
| 2016/0007181 A1* | 1/2016 | Palin | H04B 17/318 455/41.2 |
| 2016/0100276 A1* | 4/2016 | Viswanadham | H04W 8/005 455/41.2 |
| 2018/0374126 A1* | 12/2018 | Patil | B60W 40/08 |
| 2019/0005412 A1* | 1/2019 | Matus | G06Q 30/0201 |
| 2019/0044951 A1* | 2/2019 | Zivkovic | H04L 67/535 |
| 2019/0166453 A1* | 5/2019 | Edge | G01S 5/06 |
| 2021/0126912 A1 | 4/2021 | Maclean et al. | |
| 2021/0370867 A1* | 12/2021 | Morosawa | G06V 20/59 |

\* cited by examiner

*Primary Examiner* — Rebecca E Song
(74) *Attorney, Agent, or Firm* — Treyz Law Group, P.C.; G. Victor Treyz; Kendall P. Woodruff

(57) ABSTRACT

A system may have electronic devices with wireless communications circuitry. Devices may transmit short-range wireless signals such as advertising packets. Each advertising packet may contain information on the motion context of the transmitting device. By comparing motion context information for received packets with local motion context information, an electronic device may analyze received signal strength indicator measurements with enhanced accuracy. Presence-in-vehicle state information and/or other device context may also be obtained from nearby devices by comparing local and received motion context.

10 Claims, 5 Drawing Sheets

SCAN X

| LOCAL STATE | | REMOTE-1 STATE | |
|---|---|---|---|
| VEHICLE | 0 | VEHICLE | 1 |
| % TRAVELING | 0 | % TRAVELING | 0 |
| | 0 | | 20 |
| | 50 | | 80 |

34 points to LOCAL STATE table; 32-1 points to REMOTE-1 STATE table.

*FIG. 8*

SCAN Y

| LOCAL STATE | | REMOTE-1 STATE | | REMOTE-2 STATE | |
|---|---|---|---|---|---|
| VEHICLE | 0 | VEHICLE | 1 | VEHICLE | 0 |
| % TRAVELING | 0 | % TRAVELING | 0 | % TRAVELING | 100 |
| | 0 | | 0 | | 80 |
| | 0 | | 0 | | 40 |

*FIG. 9*

SCAN Z

| LOCAL STATE | | REMOTE-1 STATE | | REMOTE-2 STATE | |
|---|---|---|---|---|---|
| VEHICLE | 0 | VEHICLE | 1 | VEHICLE | 0 |
| % TRAVELING | 0 | % TRAVELING | 0 | % TRAVELING | 0 |
| | 0 | | 0 | | 0 |
| | 0 | | 0 | | 50 |

*FIG. 10*

ELECTRONIC DEVICES WITH MOTION-BASED PROXIMITY SENSING

This application claims the benefit of provisional patent application No. 63/059,883, filed Jul. 31, 2020, which is hereby incorporated by reference herein in its entirety.

FIELD

This relates generally to electronic devices, and, more particularly, to electronic devices with wireless communications circuitry.

BACKGROUND

Electronic devices are often carried by users. Electronic devices may have wireless communications circuitry that is used to transmit and receive wireless information.

SUMMARY

Electronic devices such as cellular telephone, wristwatches, and other portable devices are often worn or carried by users. Devices with wireless communications circuitry may transmit wireless signals periodically. Other devices may measure the strength of the received signals to produce received signal strength indicators that are used in determining whether the transmitting and receiving devices are in close proximity to each other.

Electronic device sensors such as accelerometers and/or other sensors may be used to determine whether a user is performing certain activities that involve motion such as running, walking, or cycling. This motion information, which may sometimes be referred to as motion context, may be transmitted to other devices. For example, devices may include motion context in transmitted Bluetooth® advertising packets.

Devices that receive the advertising packets may compare motion context from the received packets with local motion context. This comparison may allow local devices to process received signal strength indicators to ignore erroneously low measurements and thereby enhance proximity measurement accuracy.

Presence-in-vehicle state information and/or other device context may also be obtained from nearby devices by comparing local and received motion context. For example, when a device that is transmitting advertising packets and a receiving device are located in the same vehicle, compared motion context and a predetermined threshold time period may be used in determining whether the receiving device should update its presence-in-vehicle state based on the known presence-in-vehicle state of the transmitting device.

BRIEF DESCRIPTION OF THE DRAWINGS

FIGS. 8, 9, and 10 are tables of information of the type that may be used to determine when devices are in a vehicle in accordance with an embodiment.

DETAILED DESCRIPTION

Figure 1:
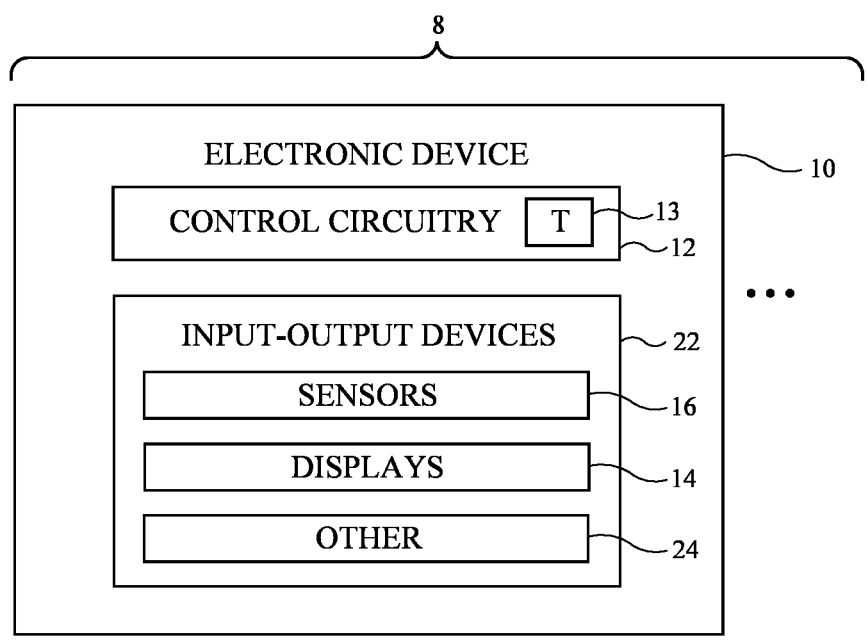
FIG. 1 is a diagram of an illustrative electronic device in accordance with an embodiment.

Electronic devices are often carried by users as they conduct their daily activities. For example, a user may carry an electronic device while riding in a vehicle or climbing stairs. To provide a user with fitness tracking functionality and other functions, it may be desirable to monitor a user's activities. For example, sensors in an electronic device may monitor user movement. In an illustrative configuration, a motion sensor such as an accelerometer, an altimeter, and/or other sensors in an electronic device may be used in determining when a user has climbed a flight of stairs or performed other physical activities.

Information on a user's location can be gathered and this information may be used to enhance the accuracy of physical activity tracking operations and other device functions. If, as an example, it is determined that a user is located in a vehicle, an electronic device can ignore changes in altimeter readings that might otherwise indicate that a user is climbing stairs.

Information on whether a user is in a vehicle may, in some arrangements, be obtained from another user in the vehicle. For example, a first user may be located in a vehicle and may be wirelessly linked to a hands-free headset (hands-free speaker system) in the vehicle. In this way, the first user's device can conclude with high certainty that the first user and first user's device are in the vehicle. When a second user with a second device determines that the second device is in close proximity to the first user for more than a predetermined amount of time, and the motion context (e.g., walking, running, sitting, etc.) of the two devices are similar, the second device can conclude that the second user is also located in the vehicle.

To determine when devices are in close proximity to each other, devices may transmit and receive wireless signals. As an example, devices may transmit wireless local area network packets such as Bluetooth® advertising packets while monitoring for transmitted Bluetooth® advertising packets or other information transmitted by other devices.

Received signal strength indicators can be obtained from received advertising packets. The magnitudes of the received signal strength indicators can be evaluated to help determine whether devices are close to each other. Larger signal strengths generally reveal that devices are in close proximity, whereas smaller signal strengths generally reveal that devices are farther apart.

Received signal strength measurements taken alone may not always accurately reflect the amount of physical separation between transmitting and receiving devices. This is because device orientation and potential interference from interposed people and objects can influence signal strength measurements.

To enhance proximity measurement accuracy, information about whether a device and the user of the device have been traveling recently (e.g., motion context information indicating that the user has been running, jogging, walking, or cycling, as examples), may be transmitted with the advertising packets. Devices that receive transmitted motion context information from other devices can compare their local motion context information with the received motion context information. By comparing remote and local motion context, devices can gain insight into the potential causes in variations in the signal intensity associated with transmitted packets. This allows the devices to satisfactorily gauge whether fluctuations in received signal strength measurements correspond to changes in the distance between transmitting and receiving devices or correspond to temporary signal blockages that should be ignored.

In general, any suitable electronic devices may be used in transmitting and receiving wireless signals with motion context and in using signal strength measurements, motion context, and other information to provide users with proximity-based services and other functionality. As shown in FIG. 1, one or more electronic devices 10 may be used in system 8. Device 10 of FIG. 1 may be, for example, a laptop computer, a computer monitor containing an embedded computer, a tablet computer, a desktop computer, a cellular telephone, a media player, or other handheld or portable electronic device, a smaller device such as a wristwatch device, a wristband device, a pendant device, a headphone or earpiece device, a head-mounted device such as glasses, goggles, a helmet, or other equipment worn on a user's head, or other wearable or miniature device, a television, a computer display that does not contain an embedded computer, a gaming device, a navigation device, an embedded system such as a system in which equipment is mounted in a kiosk, in an automobile, airplane, or other vehicle, a removable external case for electronic equipment, an accessory such as a remote control, computer mouse, track pad, wireless or wired keyboard, or other accessory, and/or equipment that implements the functionality of two or more of these devices. Illustrative configurations in which electronic devices 10 are portable electronic devices such as cellular telephones, wristwatches, and portable computers may sometimes be described herein as an example.

As shown in FIG. 1, electronic devices such as electronic device 10 may have control circuitry 12. Control circuitry 12 may include storage and processing circuitry for controlling the operation of device 10. Circuitry 12 may include storage such as hard disk drive storage, nonvolatile memory (e.g., electrically-programmable-read-only memory configured to form a solid-state drive), volatile memory (e.g., static or dynamic random-access-memory), etc. Processing circuitry in control circuitry 12 may be based on one or more microprocessors, microcontrollers, digital signal processors, baseband processors, power management units, audio chips, graphics processing units, application specific integrated circuits, and other integrated circuits. Software code may be stored on storage in circuitry 12 and run on processing circuitry in circuitry 12 to implement control operations for device 10 (e.g., data gathering operations, operations involving the adjustment of the components of device 10 using control signals, etc.). Control circuitry 12 may include wired and wireless communications circuitry. For example, control circuitry 12 may include radio-frequency transceiver circuitry 13 such as cellular telephone transceiver circuitry, wireless local area network transceiver circuitry (e.g., WiFi® circuitry), short-range radio-frequency transceiver circuitry that communicates over short distances using ultra high frequency radio waves (e.g., Bluetooth® circuitry operating at 2.4 GHz or other short-range transceiver circuitry), millimeter wave transceiver circuitry, and/or other wireless communications circuitry.

During operation, the communications circuitry of the devices in system 8 (e.g., the communications circuitry of control circuitry 12 of device 10), may be used to support communication between the electronic devices. For example, one electronic device may transmit video data, audio data, and/or other data to another electronic device in system 8. Bluetooth circuitry may transmit Bluetooth advertising packets and other Bluetooth packets that are received by Bluetooth receivers in nearby devices. Electronic devices in system 8 may use wired and/or wireless communications circuitry to communicate through one or more communications networks (e.g., the internet, local area networks, etc.). The communications circuitry may be used to allow data to be transmitted to and/or received by device 10 from external equipment (e.g., a tethered computer, a portable device such as a handheld device or laptop computer, online computing equipment such as a remote server or other remote computing equipment, an accessory such as a hands-free audio system in a vehicle or a wireless headset, or other electrical equipment) and/or to provide data to external equipment.

Device 10 may include input-output devices 22. Input-output devices 22 may be used to allow a user to provide device 10 with user input. Input-output devices 22 may also be used to gather information on the environment in which device 10 is operating. Output components in devices 22 may allow device 10 to provide a user with output and may be used to communicate with external electrical equipment.

As shown in FIG. 1, input-output devices 22 may include one or more optional displays such as displays 14. Displays 14 may be organic light-emitting diode displays or other displays with light-emitting diodes, liquid crystal displays, or other displays. Displays 14 may be touch sensitive (e.g., displays 14 may include two-dimensional touch sensors for capturing touch input from a user) and/or displays 14 may be insensitive to touch.

Input-output circuitry 22 may include sensors 16. Sensors 16 may include, for example, three-dimensional sensors (e.g., three-dimensional image sensors such as structured light sensors that emit beams of light and that use two-dimensional digital image sensors to gather image data for three-dimensional images from light spots that are produced when a target is illuminated by the beams of light, binocular three-dimensional image sensors that gather three-dimensional images using two or more cameras in a binocular imaging arrangement, three-dimensional lidar (light detection and ranging) sensors, three-dimensional radio-frequency sensors, or other sensors that gather three-dimensional image data), cameras (e.g., infrared and/or visible digital image sensors), gaze tracking sensors (e.g., a gaze tracking system based on an image sensor and, if desired, a light source that emits one or more beams of light that are tracked using the image sensor after reflecting from a user's eyes), touch sensors, capacitive proximity sensors, light-based (optical) proximity sensors, other proximity sensors, force sensors, sensors such as contact sensors based on switches, gas sensors, pressure sensors, moisture sensors, magnetic sensors, audio sensors (microphones), ambient light sensors, microphones for gathering voice commands and other audio input, sensors that are configured to gather information on motion, position, and/or orientation (e.g., accelerometers, gyroscopes, compasses, and/or inertial measurement units that include all of these sensors or a subset of one or two of these sensors), and/or other sensors.

User input and other information may be gathered using sensors and other input devices in input-output devices 22. If desired, input-output devices 22 may include other devices 24 such as haptic output devices (e.g., vibrating components), light-emitting diodes and other light sources, speakers such as ear speakers for producing audio output, circuits for receiving wireless power, circuits for transmitting power wirelessly to other devices, batteries and other energy storage devices (e.g., capacitors), joysticks, buttons, and/or other components.

During operation, devices 10 may transmit wireless signals such as Bluetooth signals or other short-range wireless signals and may monitor for these signals from other devices 10.

For example, devices 10 may transmit Bluetooth signals such as Bluetooth advertising packets that are received by other devices 10. Transmitting devices 10 may sometimes be referred to as remote devices, whereas receiving devices 10 may sometimes be referred to as local devices. In transmitting Bluetooth advertisements (advertisement packets), each remote device may include information in the transmitted advertisements on the recent movement activity of that remote device and other information about the state of the remote device. Movement activity, which may sometimes be referred to as motion context, user motion information, or motion activity information, reflects the recent activities of the user of the remote device involving movement of the user's body (e.g. activities such as resting by sitting and/or standing or moving by walking, running, and/or cycling). Using Bluetooth advertising so that remote devices can advertise their motion context and using a corresponding Bluetooth discovery process so that local devices can receive this advertised motion context, the accuracy with which devices can determine their separation distance (as measured, for example, from the measured strength of received Bluetooth signals) can be enhanced. The ability for devices to share information (device context) on whether a device is or is not present in a vehicle or is or is not indoors may also be enhanced.

During operation, devices 10 may use sensors 16, wireless circuitry such as satellite navigation system circuitry, and/or other circuitry in making measurements that are used in determining a device's motion context. For example, motion data from an accelerometer and/or an inertial measurement unit may be used to identify if a user's motions (e.g., repetitive up and down motions and/or other motions with a particular intensity, a particular cadence, or other recognizable pattern) correspond to walking, running, or cycling. If desired, location information from a satellite navigation system receiver may be used in determining a user's velocity and thereby determining whether a user is or is not walking, running, or cycling. In some arrangements, the frequency with which a user's cellular telephone transceiver links to different cellular telephone towers may be analyzed to help determine the user's motion. The user's frequency of linking to or receiving signals from different wireless local area network hotspots may also be analyzed to help determine the user's motion and/or other sensor information (e.g., altimeter readings indicating changes in altitude, etc.) may be gathered and processed to determine a user's activity. These techniques and/or other techniques may be used in determining motion context. In an illustrative arrangement, a device may maintain motion context information in the form of a set of historical motion activity metric values (e.g., metric values ordered versus time in a motion context table).

In addition to gathering and processing sensor data and other data indicative of the user's motion context, control circuitry 12 (e.g., Bluetooth circuitry and/or other wireless communications circuitry in control circuitry 12) in devices 10 may, if desired, monitor whether devices 10 are wirelessly linked by a short-range wireless link (e.g., via Bluetooth) to handsfree audio systems in vehicles or other vehicle equipment known to be located in or associated with vehicles. In this way, the in-vehicle status of devices 10 can be determined. For example, control circuitry 12 in a given device can determine whether the given device is preset in a vehicle or not based on whether circuitry 12 is or is not wirelessly linked with an in-vehicle hands-free system. A presence-in-vehicle variable such as "VEHICLE" can be set to true ("1") if the device is in a vehicle and can be set to false ("0") if the remote device is not in a vehicle.

In addition to this presence-in-vehicle state information, control circuitry 12 can determine other information about the location of devices 10. As an example, control circuitry 12 can conclude that a device is indoors if the device is linked by a short-range wireless link to in-home equipment (e.g., a set-top box, television, countertop speaker, in-home desktop computer, etc.) and can determine that the device is not indoors (and is therefore outdoors) if the device is not linked to this type of in-home equipment and, if desired, sensors in the device sense one or more additional indicators of presence in an outdoors environment such as bright sunlight, etc. Illustrative scenarios in which devices 10 are determined to be either in a vehicle (VEHICLE is 1) or not in a vehicle (VEHICLE is 0) may sometimes be described herein as an example. In general, any suitable device status information (e.g. device context such as in-vehicle states, indoor-outdoor states, etc.) may be determined by devices 10 and can potentially be shared between devices, as appropriate.

Figure 2:
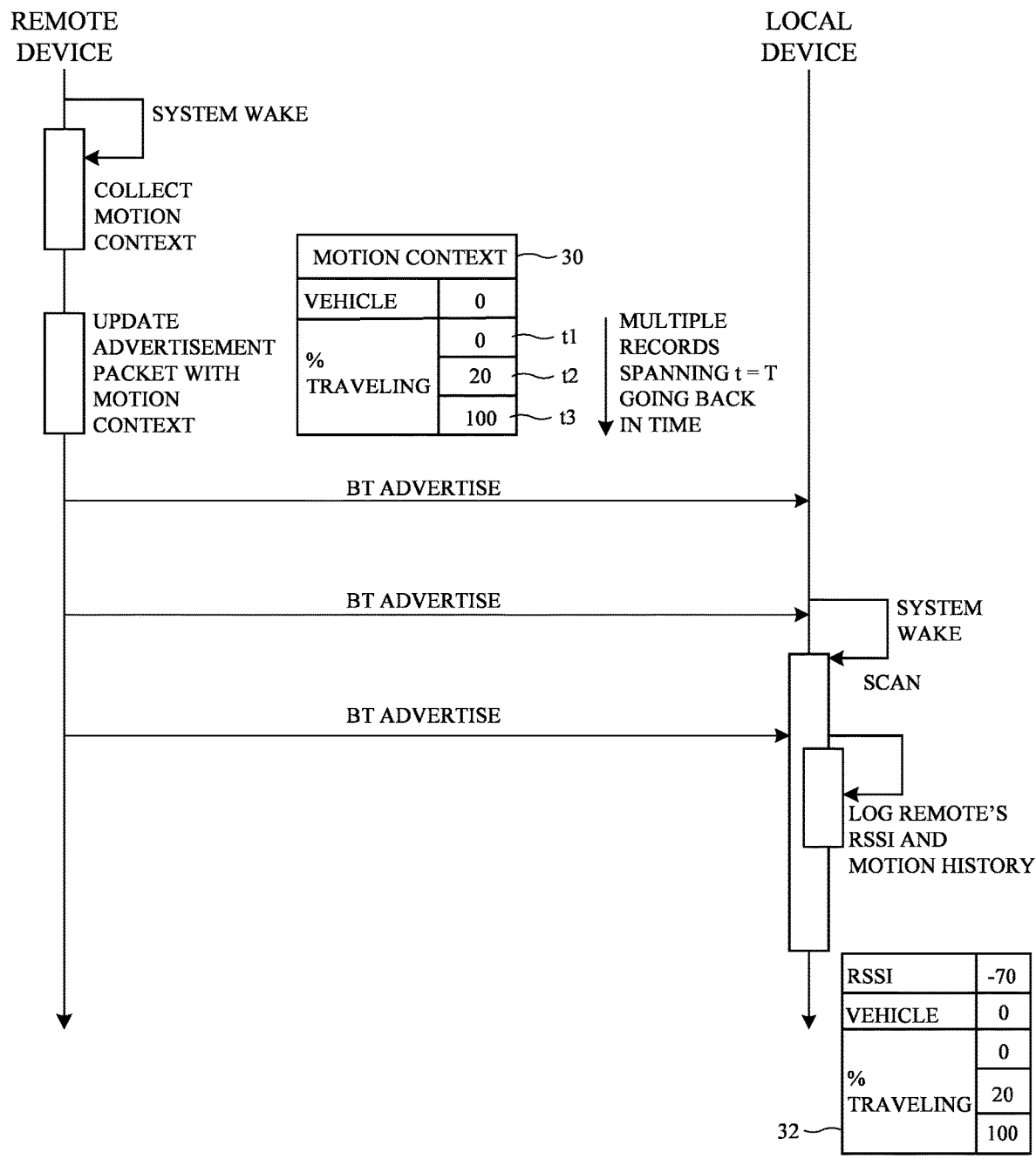
FIG. 2 is a schematic diagram of a pair of wirelessly communicating electronic devices in accordance with an embodiment.

The motion context of devices 10 may be represented by a set of historical motion activity metrics. In the example of FIG. 2, devices 10 are using a motion metric that is sometimes referred to as "percentage traveling". A low "percentage traveling" value (e.g. a % traveling value of 0) indicates that control circuitry 12 of a given device has used the sensors and/or other circuitry of the device to determine that the device is not moving (e.g., the user of the device is sitting or standing with the remote device in the user's pocket, the remote device is resting on a table next to the user, etc.). A high "percentage traveling" value (e.g., a % traveling value of 100%) indicates a large amount of movement (e.g., a user is actively walking, running, or cycling). Intermediate "percentage traveling" values (e.g., a % traveling value of 20%) indicates that a device is experiencing an amount of motion activity that falls between the fully resting and fully moving conditions (e.g., intermittent walking over a given sampling period).

Both device context such as an in-vehicle state represented by the value of VEHICLE (and/or optionally an indoor-outdoor state or other state) and motion context data such as a series of % traveling values may be shared between devices via Bluetooth.

As shown in the illustrative example of FIG. 2, a remote device (e.g., control circuitry 12 in a first of devices 10 in system 8) may, upon awakening, use sensors 16 and/or other circuitry in gathering motion context. As shown in FIG. 2, the remote device may then place the motion context into a wireless advertisement packet (e.g., a Bluetooth advertisement packet) and may transmit this packet repeatedly for potential reception by a local device.

The motion context being transmitted by the remote device is shown in table 30 of FIG. 2. As shown in this table, a set of historical % traveling values (e.g., for time periods t1, t2, and t3 in this example) may be maintained by device 10 and transmitted in a Bluetooth advertisement. Time periods t1, t2, and t3 may, as an example, correspond to a current time period and two successively earlier time periods. Time period t1 may correspond, for example, to a current time period (e.g., t1=0-60 seconds before the present time), time t2 may be a previous time period (e.g., t2=60-120 seconds before the present time), and time period t3 may be an earlier time period (e.g., t3=120-180 seconds before the present time). The motion context for the device may be represented by the motion metric value (% traveling value) for each of these time periods (and/or other suitable time periods).

While the remote device of FIG. 2 is advertising its motion context in this way, the remote device and local device may come within range of each other. In the example of FIG. 2, a local device experiences a system wake event while in Bluetooth range of the remote device. Upon awakening, the local device of FIG. 2 begins scanning for incoming Bluetooth advertisement packets from nearby devices and, in this example, receives the transmitted Bluetooth advertisement packet from the remote device. The local device of FIG. 2 that receives the transmitted packet is within 400 m, within 100 m, within 20 m, or other short-range distance (e.g., within Bluetooth range) of the remote device.

To determine the distance between the remote device and the local device, the local device may measure the signal strength of the received Bluetooth advertisement packet. In the example of FIG. 2, this measured signal strength, which may sometimes be referred to as a received signal strength indicator (RSSI) has a value of −70 dB, as indicated by the RSSI entry in table 32. Table 32 also contains the received motion context from the remote device. In addition to this received motion context, the local device may maintain its own motion context (e.g., control circuitry 12 in the local device may monitor sensors and other circuitry in the local device to determine if the user is resting, walking, etc. and may maintain a corresponding history of % traveling values at times t1, t2, and t3 for the local device).

Figure 4:
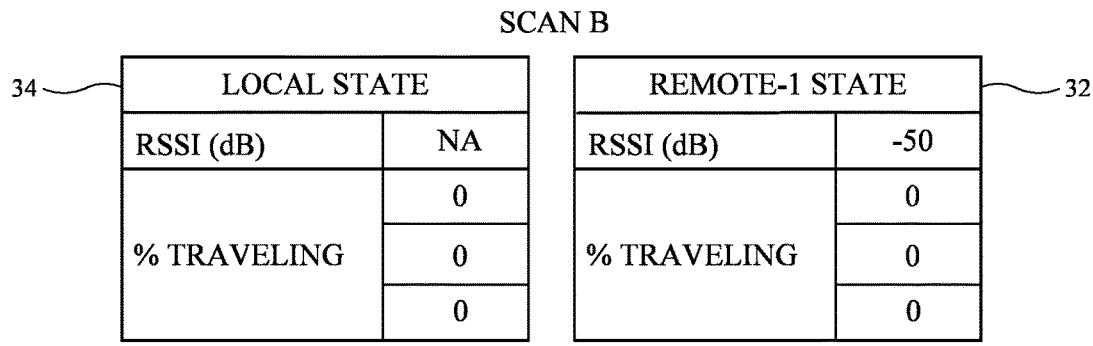
Figure 5:
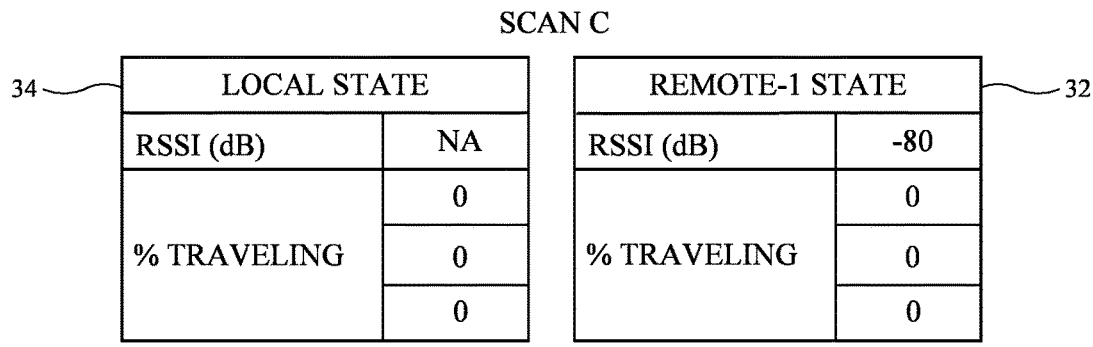

By comparing the motion context received from the remote device with the motion context maintained locally, measured RSSI values can be processed to reduce false readings. Consider, as an example, the scenario of FIGS. 3, 4, and 5, corresponding to three successive periods of time (SCAN A, SCAN B, and SCAN C). In this scenario, a remote device is transmitting its motion context in Bluetooth advertising packets. The local device is receiving each Bluetooth packet and is computing a corresponding RSSI value for that packet (by measuring the signal strength associated with the received packet). Remote tables 32 represent the advertised motion context of the remote device that has been received at the local device for each time period. Local tables 34 represent the motion context of the local device during each time period.

Figure 3:
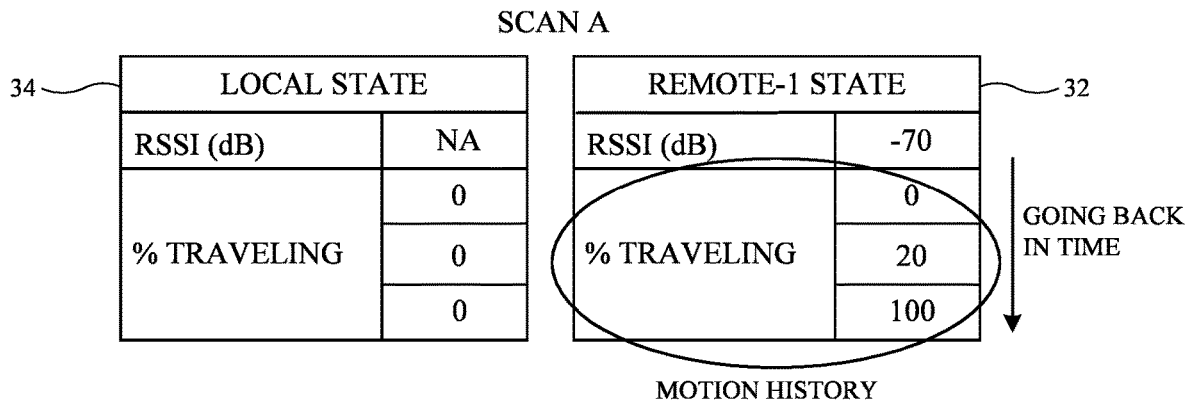
FIGS. 3, 4, and 5 are tables of information of the type that may be used to maintain information on motion history in accordance with an embodiment.

As shown in FIG. 3, during the first time period (SCAN A), the RSSI of the received advertising packet from the remote device has a value of −70 dB. The local and remote devices both have a current % traveling value of 0, indicating that both the remote and local users are stationary (e.g., sitting near each other at a café). The local user's device is able to ascertain that the remote and local devices are both stationary, because the remote user's Bluetooth advertising packet included the remote user's motion context (table 32), which the local device can compare to the local user's motion context (table 34).

During the first time period (SCAN A), an interloper (e.g., a passerby) is present between the remote user and local user. Because the interloper happened to be walking between the remote and local users during SCAN A, the presence of the interloper's body attenuated the Bluetooth signal associated with the remote user's Bluetooth advertising packet so that the measured RSSI value of −70 dB is erroneously low (in this example). This erroneously indicates to the local device that the remote device and remote user are farther away from the local device and local user than is actually the case. As an example, the −70 dB RSSI value may be indicative of a 20 m separation between the remote and local users, whereas the actual separation between the local and remote users may be 2 m.

During the second time period (SCAN B of FIG. 4), the measured RSSI value is −50 dB. At this moment in time, local and remote users are still sitting near each other (as indicated by their current 0% traveling values). The interloper is no longer present, so the interloper's body does not attenuate the remote user's Bluetooth advertising packet. Accordingly, the RSSI value measured at the local user (−50 dB in this example) is accurate.

During the third time period (SCAN C of FIG. 5), the local and remote users both remain seated near each other. The remote user has, however, moved the remote device to a location that is blocked by the remote user's body. As a result of this blockage, the remote user's transmitted Bluetooth advertising packet is attenuated by the body of the remote user, causing the RSSI value that is measured at the local user to be erroneously low (−80 dB in this example).

Figure 6:
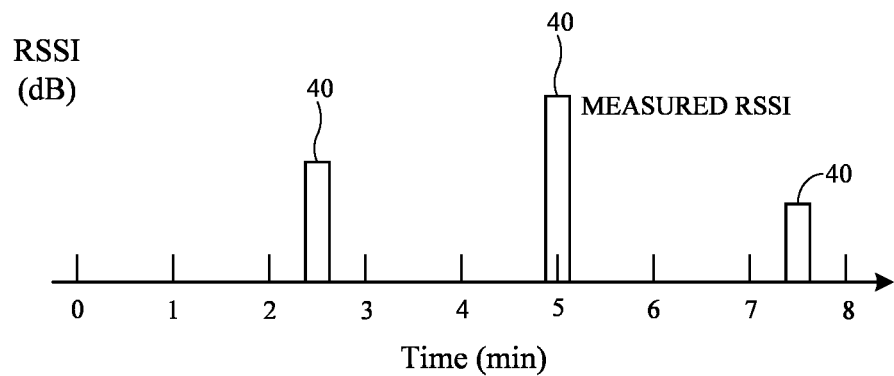
FIG. 6 is a graph or raw received signal strength information in accordance with an embodiment.
Figure 7:
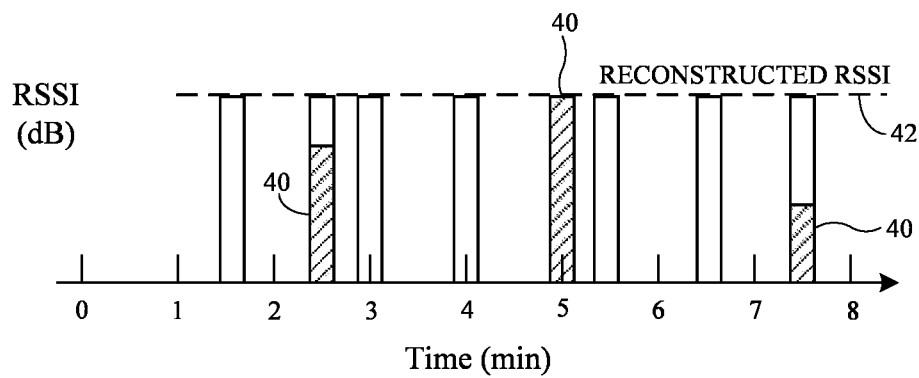
FIG. 7 is a graph of processed received signal strength information in accordance with an embodiment.

FIG. 6 is a graph of the RSSI values 40 measured during SCAN A (e.g., at 2.5 minutes), during SCAN B (e.g., at 5 minutes), and during SCAN C (e.g., at 7.5 minutes). Without processing of these signals using motion context, the local user's device does not know which of the RSSI values is correct or might assume that the remote user only briefly passed by the local user. By comparing the % traveling values received from the advertising packets (tables 32) with % traveling values of the local device, the local device can determine that neither of the users moved during the RSSI measurements. The local device can therefore conclude that the RSSI measurements made during SCAN A and SCAN C were erroneously low and that the RSSI measurement made during SCAN B is correct. As shown in FIG. 7, this allows the local device to reconstruct a series of RSSI values over time using the true RSSI value (represented by the −50 dB level of RSSI value 42 of FIG. 7) in which the erroneously low readings among measured readings 40 are ignored. The determination that the remote and local users had a shared motion context throughout a series of RSSI measurements allows the local device to take the highest RSSI value as the true RSSI value while the lower values can all be discarded as erroneous.

By accurately measuring RSSI values in this way, a local user may accurately monitor user proximity (e.g., the smallest separation experienced between a stationary remote user and a stationary local user over a period of time). If desired, shared motion context may also be used to determine if remote and local users who are both moving are in close proximity for an extended period of time. For example, a local device may determine that a remote and local user have been walking side by side for 10 minutes by correlating received remote user motion context with local user context in addition to evaluating the RSSI of the remote user's Bluetooth advertising packets.

Device context can also be shared accurately using motion context from a Bluetooth advertising packet. This type of a scenario is illustrated in FIGS. 8, 9, and 10. In this illustrative scenario, the local device's motion context and VEHICLE state, which represents whether the local device is present in a vehicle, are represented by tables 34, a first remote user's motion context and VEHICLE state are represented by tables 32-1, and a second remote user's motion context and VEHICLE state are represented by tables 32-2. The first remote user is always close to the local user in this example (RSSI from the first remote user's Bluetooth advertising packets is always high) and the second remote user is close to the local user during SCAN Y and SCAN Z (e.g., measured RSSI for the second remote user's Bluetooth advertising packets is high during these scans). During SCAN X, the second remote user is not present (in this example).

Initially, the first remote user and the local user are sitting together in a stationary vehicle (SCAN X of FIG. 8) and the second remote user is not present. The state of VEHICLE for the first remote user is 1 (true) because the device of the first remote user (in this example) is connected to a the handsfree audio system of the vehicle of the first remote user. During SCAN X, the local device does not connect to the handsfree audio system, because the local device is not aware of its presence and/or the local user does not have permission to connect to this system. Accordingly, the local device is not directly aware that the local user is present in a vehicle. The local device can recognize that the local device and first remote user's device have an identical motion context (% traveling is 0 for both the first remote user's device and the local device) and can observe that the first remote user's VEHICLE state is 1, but because it is conceivable that the local user is sitting outside of the vehicle rather than in the vehicle, the local user's device does not yet update the local user's VEHICLE state based the first remote device's VEHICLE state.

During SCAN Y, which is taken 2.5 minutes after SCAN X, the second remote user has come into proximity of the local user. The second remote user may be, as an example, a pedestrian who is adjacent to the vehicle during SCAN Y. As a result, the local device receives the first remote user's VEHICLE state and motion context (table 32-1) and the second remote user's VEHICLE state and motion context (table 32-2). The second remote user is moving (% traveling is 100) and therefore does not have the same motion context as the local user. The local user therefore ignores the VEHICLE state of the second remote user. The first remote user and the local user have the same motion context (% traveling is 0), but because the first remote user and local user have only been in proximity of each other for less than a predetermined threshold amount of time (less than a threshold of 3 minutes in this example), the local device does not yet accept the VEHICLE state of the first remote user. The threshold amount of time may correspond to an amount of time after which it is expected that a vehicle would move (e.g., an amount of time greater than the amount of time the vehicle would be stopped at a stoplight). By waiting for the threshold amount of time before updating the local device's VEHICLE state with the VEHICLE state from a remote user with a matching stationary motion context, the local device can accurately determine whether the local and remote devices have remained stationary together for sufficiently long to allow the local device to conclude that the local and remote device are together within the vehicle.

During SCAN Z, which is taken 5 minutes after SCAN X, sufficient time has elapsed (e.g., more time than the predetermined threshold) to allow the local device to conclude that the first remote device and local device are located in the same vehicle. The local device therefore updates its VEHICLE state to 1 based on the known VEHICLE state (1) of the first remote device. SCAN Z is only 2.5 minutes (less than the threshold amount) after SCAN Y, so insufficient time has elapsed for the local device to update its VEHICLE state to that of the VEHICLE state of the second remote user, even though the second remote user is now stationary.

As this example demonstrates, RSSI information associated with Bluetooth advertising packets, shared motion context, and application of a threshold time period allow the VEHICLE state of devices 10 to be updated accurately. This provides additional information about which devices have dwelled in the vicinity of each other (e.g., which devices have remained stationary while physically close to each other such as when users are seated adjacent to each other at a café and which devices are associated with users in proximity of each other within a shared space such as vehicle, even as that vehicle potentially passes by pedestrians and others outside the vehicle).

Accurate knowledge of when a device is in a vehicle may be used during any suitable operations performed by the device. As an example, device 10 may periodically issue reminders to a user to stand up and move about (e.g., when a health-related application is running on device 10 that is being used to remind a user to avoid remaining seated for a prolonged period of time). These reminders are inappropriate when a user is seated in the interior of a vehicle. By obtaining accurate knowledge of the state of VEHICLE, reminders to stand up can be suppressed when the user is in a vehicle. As another example, measured variations in altitude may be associated with climbing stairs and may be monitored by a health-related application. To avoid erroneously awarding a user with credit for climbing a flight of stairs in scenarios in which the user is riding a vehicle that experiences elevation changes, a device may monitor the state of VEHICLE and can suppress stair climbing credits whenever a stair climbing count is about to be awarded while a user is inside of a vehicle.

In general, any suitable action may be taken based on the values determined for reconstructed RSSI using shared motion context and/or the accurately determined VEHICLE values obtained using the arrangement of FIGS. 8, 9, and 10. For example, information the times, locations, and identities (e.g., anonymized identities) of users that come into close proximity with a given user for more than a predetermined amount of time (e.g., while at rest at a café for more than a predetermined time and/or within a predetermined distance, while at rest within a vehicle for more than a predetermined amount of time, etc.) may be logged and/or alerts generated for a local user and/or for remote users in response to detecting these conditions, etc.

As described above, one aspect of the present technology is the gathering and use of information such as information from input-output devices. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

The foregoing is illustrative and various modifications can be made to the described embodiments. The foregoing embodiments may be implemented individually or in any combination.

TABLE of

| Reference Numerals | | | |
|---|---|---|---|
| 10 | Electronic Devices | 12 | Control Circuitry |
| 22 | Input-Output Devices | 8 | System |
| 14 | Displays | 16 | Sensors |
| 24 | Other | 30, 32, 34, 32-1, 32-2 | Tables |
| 40 | Measured RSSI | 42 | Reconstructed RSSI value |

What is claimed is:

1. An electronic device, comprising:
   a sensor;
   a short-range radio-frequency transceiver configured to receive advertisement packets from a remote device, wherein the advertisement packets include remote device motion context; and
   control circuitry configured to:
      measure local motion context with the sensor; and
      measure received signal strength indicator values associated with the received advertisement packets;
      compare the remote motion context and the local motion context; and
      ignore erroneous received signal strength indicator values from among the measured signal strength indicator values based on the comparison of the remote motion context and the local motion context.

2. The electronic device defined in claim 1 wherein the control circuitry is configured to ignore the erroneous received signal strength indicator values by ignoring all but a highest value from a series of values measured while the remote and local motion contexts match and are indicative of a stationary status.

3. The electronic device defined in claim 2 wherein the control circuitry is configured to receive a true present-in-vehicle state from the remote device when the remote device is within a vehicle.

4. The electronic device defined in claim 3 wherein the control circuitry is configured to update a local present-in-vehicle state from false to true based on the true present-in-vehicle state received from the remote device.

5. The electronic device defined in claim 4 wherein the control circuitry is configured to update the local present-in-vehicle state based at least partly on comparison of the remote motion context to the local motion context.

6. The electronic device defined in claim 5 wherein the control circuitry is configured to update the local present-in-vehicle state based at least partly on determining from the remote motion context that the remote device is stationary and that the remote motion context matches the local motion context.

7. The electronic device defined in claim 6 wherein the control circuitry is configured to update the local presentin-vehicle state from false to true based at least partly on determining that the local and remote motion contexts have matched for at least a predetermined threshold amount of time.

8. The electronic device defined in claim 7 wherein the short-range radio-frequency transceiver comprises a Bluetooth transceiver.

9. The electronic device defined in claim 1 wherein the advertisement packets comprise Bluetooth advertisement packets.

10. An electronic device configured to receive short-range advertisement packets containing remote device motion activity metric information from a remote electronic device, comprising:
- a sensor configured to measure movement of the electronic device;
- a radio-frequency transceiver configured to receive the short-range advertisement packets, wherein the short-range advertisement packets comprise Bluetooth advertisement packets; and
- control circuitry configured to:
  - compare the remote device motion activity metric information to the measured movement of the electronic device;
  - measure received signal strength indicators associated with the received short-range advertisement packets;
  - determine whether the remote electronic device is in proximity to the control circuitry at least partly using the received signal strength indicators;
  - determine when the remote electronic device is stationary and has remote device motion activity metric information that matches the measured movement of the electronic device; and
  - determine whether any of the received signal strength indicators are erroneous by having a value lower than at least one other received signal strength indicator measured while the remote electronic device is stationary and has remote device motion activity metric information that matches the measured movement of the electronic device.

\* \* \* \* \*